United States Patent
Chen

(10) Patent No.: US 8,118,139 B2
(45) Date of Patent: Feb. 21, 2012

(54) THERMOELECTRIC TEMPERATURE CONTROL WITH CONVECTIVE AIR FLOW FOR COOLING ELEVATOR COMPONENTS

(75) Inventor: Lei Chen, South Windsor, CT (US)

(73) Assignee: Otis Elevator Company, Farmington, CT (US)

( * ) Notice: Subject to any disclaimer, the term of this patent is extended or adjusted under 35 U.S.C. 154(b) by 449 days.

(21) Appl. No.: 12/523,038

(22) PCT Filed: Jan. 11, 2007

(86) PCT No.: PCT/US2007/000745
§ 371 (c)(1),
(2), (4) Date: Jul. 13, 2009

(87) PCT Pub. No.: WO2008/085172
PCT Pub. Date: Jul. 17, 2008

(65) Prior Publication Data
US 2010/0072001 A1      Mar. 25, 2010

(51) Int. Cl.
*B66B 1/34* (2006.01)
(52) U.S. Cl. ............ 187/391; 187/413; 361/679.5
(58) Field of Classification Search .......... 187/272, 187/277, 290, 391–393, 413, 414; 361/701, 361/702, 707, 711, 715–722, 679.46, 679.49, 361/679.5; 165/80.1, 80.2, 80.3, 80.5
See application file for complete search history.

(56) References Cited

U.S. PATENT DOCUMENTS

| | | | | |
|---|---|---|---|---|
| 3,610,371 A | * | 10/1971 | Abbott | 187/290 |
| 4,955,203 A | | 9/1990 | Sundhar | |
| 5,057,968 A | * | 10/1991 | Morrison | 361/700 |
| 5,271,455 A | * | 12/1993 | Semple | 165/80.4 |
| 5,842,544 A | * | 12/1998 | Katano et al. | 187/272 |
| 6,321,877 B2 | * | 11/2001 | Yamakawa | 187/391 |
| 6,488,126 B1 | | 12/2002 | Yamakawa et al. | |
| 6,832,646 B1 | * | 12/2004 | Uomori et al. | 165/80.2 |
| 2007/0056293 A1 | | 3/2007 | Chang et al. | |
| 2010/0065380 A1 | * | 3/2010 | Chen et al. | 187/290 |
| 2010/0288586 A1 | * | 11/2010 | Gorbounov et al. | 187/250 |

FOREIGN PATENT DOCUMENTS

KR    20030063595    7/2003

OTHER PUBLICATIONS

PCT International Search Report and Written Opinion of the International Searching Authority, May 10, 2007, 11 pages.

* cited by examiner

*Primary Examiner* — Anthony Salata
(74) *Attorney, Agent, or Firm* — Kinney & Lange, P.A.

(57) ABSTRACT

Components of an elevator system are cooled using natural convective airflow in conjunction with thermoelectric heating and cooling. Rising air within the hoistway is funneled into a cold air duct (20) and a warm air duct (22). As air flows vertically upward through the cool air duct (20) and the warm air duct (22), a thermoelectric module (14) cools air in the cool air duct (20) and heats air in the warm air duct (22). The cool air stream in the cool air duct (20) is circulated past the elevator component (12), and is drawn upward into a common exhaust duct (28) by the faster flowing warm air stream in the warm air duct (22).

23 Claims, 1 Drawing Sheet

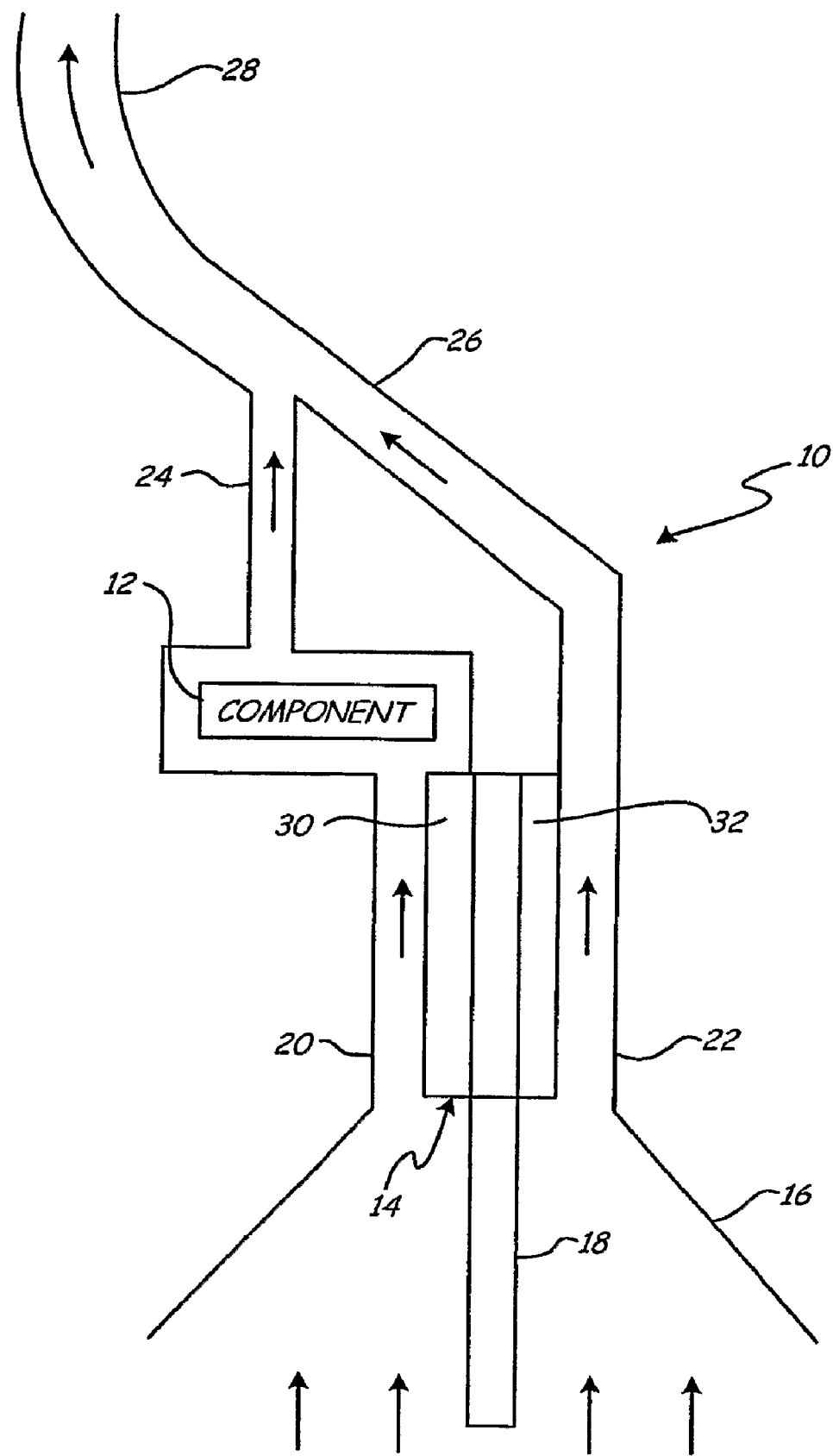

THERMOELECTRIC TEMPERATURE CONTROL WITH CONVECTIVE AIR FLOW FOR COOLING ELEVATOR COMPONENTS

REFERENCE TO CO-PENDING APPLICATIONS

Reference is made to co-pending applications entitled THERMOELECTRIC THERMAL MANAGEMENT SYSTEM FOR ENERGY STORAGE SYSTEM IN A REGENERATIVE ELEVATOR and THERMOELECTRIC THERMAL MANAGEMENT FOR DRIVE CIRCUITRY AND HOIST MOTORS IN AN ELEVATOR SYSTEM, both of which were filed even date with this application and are incorporated by reference.

BACKGROUND OF THE INVENTION

This invention relates to elevator systems. In particular, the present invention relates to a thermal management system using thermoelectric heating and cooling to maintain components of an elevator system in a desired operating temperature range. Ambient conditions for an elevator system may range, for example, from below 0° C. to about 45° C., with humidity ranging up to 95%. Components of the elevator system may be located in the machine room or the hoistway or the system, where the temperature can vary even more because these locations are not air-conditioned.

Conventionally, air-cooling using fans has been used to cool components of an elevator system, such as the hoist motor and power electronics used to drive the elevators. This passive cooling with fans has limited effectiveness, and also creates a noise source that requires additional noise suppression.

BRIEF SUMMARY OF THE INVENTION

A temperature control system for an elevator system makes use of natural convective airflow in conjunction with a thermoelectric device to provide cooling or heating of elevator components such as energy storage devices, motor drive electronics, and elevator hoist motors. The temperature management system includes a warm air duct and a cool air duct which receive rising air flow at their lower inlet ends, and which are connected together at their upper outlet ends. A thermoelectric device is positioned to heat air flowing in the warm air duct and to cool air flowing in the cool air duct. An elevator component is positioned to be cooled by air flowing in the cool air duct.

BRIEF DESCRIPTION OF THE DRAWINGS

The FIGURE is a schematic layout of a temperature control for elevator components that uses a thermoelectric cooler/heater in conjunction with convective airflow.

DETAILED DESCRIPTION

Temperature control system 10 shown in the figure provides cooling of elevator component 12 through the use of natural convective airflow and cooling and heating of air provided by thermoelectric module 14. Temperature control system 10 is particularly suitable to be implemented in an upper portion of a hoistway of an elevator system, where warmer air flows.

Temperature control system 10 includes air funnel 16, separator 18, cold air duct 20, warm air duct 22, cool air exhaust port 24, warm air exhaust 26, and common exhaust conduit 28. Control system 10 is vertically mounted so that warm air within the hoistway enters at the lower end of system 10 at funnel 16. The inlet air is separated into two flow paths by separator 18. One flow path enters cold air duct 20, while the other enters warm air duct 22.

Thermoelectric module 14 is positioned between cold air duct 20 and warm air duct 22. Cooling surface 30 of thermoelectric module 14 cools air that is flowing upward through cold air duct 20. At the same time, heating surface 32 on the opposite side of thermoelectric module 14 is in contact with air flowing through warm air duct 22. Heating surface 32 acts as heat sink for thermoelectric module 14, and transfers heat to the air flowing through warm air duct 22. As a result, the warm airflow through warm air duct 22 is accelerated as it flows toward warm air exhaust port 26.

The air flowing in cold air duct 20, after being cooled by cooling surface 30 of thermoelectric module 14, flows past elevator component 12 and then upward towards cold air exhaust port 24.

The warm airflow in warm air duct 22 flows out of warm air exhaust port 26 and into common exhaust duct 28. The warm air stream from warm air exhaust port 26 creates suction of the cooled air flowing to cool air exhaust port 24 due to the Venturi effect.

Exhaust duct 28 may be connected to a vent at the exterior of the building, or may be connected to a building ventilation system which further draws the air upward through exhaust duct 28.

By heating the warm air stream in warm air duct 22 while cooling the cool air stream in cool air duct 22, a difference in flow rates is created that aids the Venturi effect to draw the cooling air upward past elevator component 12 and into exhaust duct 28. By taking advantage of the Venturi effect and vertical convective airflow, temperature control of elevator component 12 can be achieved either without a fan or with limited use of fans. As a result, noise associated with other cooling systems used with elevators can be avoided.

Elevator component 12 may be, for example, a part of an electrical energy storage system used to store electrical energy produced by the elevator drive system when operating in a regenerative mode. The components may be batteries, capacitors, or circuitry used in conjunction with the energy storage. System 10, therefore, can be used as a part of the thermal management system described in the co-pending application entitled THERMOELECTRIC THERMAL MANAGEMENT SYSTEM FOR ENERGY STORAGE SYSTEM IN A REGENERATIVE ELEVATOR.

In the case of components such as batteries, at low ambient temperatures it is advantageous to heat rather than cool the batteries. System 10 can also be operated in a component heating mode by reversing the direction of current to thermoelectric module 14. In that case, the roles of ducts 20 and 22 are reversed, so that the warm air flows through duct 20 and cool air flows through duct 22.

In another embodiment, cooling surface 30 of thermoelectric device 14 is in physical contact with elevator component 12. In this case, the temperature of elevator component 12 is controlled via conduction and heat is ejected from the warm surface through either forced or natural convective flow. A similar configuration may be provided for heating elevator component 12, wherein heating surface 32 is in physical contact with elevator component 12.

In other embodiments, elevator component 12 may be the elevator hoist motor or the motor drive and regenerative electronics of the elevator system. Thus, temperature control system 10 can be used as a part of the system described in the co-pending application entitled THERMOELECTRIC THERMAL MANAGEMENT FOR DRIVE CIRCUITRY AND HOIST MOTORS IN AN ELEVATOR SYSTEM.

In the figure, elevator component 12 has been schematically illustrated as being positioned within cool air duct 20 so that air circulates around elevator component 12 on all sides. In some cases, only one or some of the surfaces of the elevator component 12 may be exposed to the airflow within cool air duct 20.

In a system having multiple components requiring cooling, several components may be positioned for cooling by exposure to airflow through cool air duct 20. Additional thermoelectric modules may be positioned along the path defined by cool air duct 20 in order to ensure temperature uniformity.

Although cool air duct 20 and warm air duct 22 are shown receiving air from a common air funnel 16 with a separator 18, the inlets to ducts 20 and 22 could have their own individual air funnel inlets.

Although not shown the figure, cool air duct 20 and warm air duct 22 are thermally insulated from one another, so that a temperature differential is maintained between air flowing through cool air duct 20 and air flowing through warm air duct 22. The temperature differential results in different air velocities of the two air streams, which aids in drawing the cool air upward into common exhaust duct 28.

Although system 10 offers the ability to provide airflow for the cooling function without the need for a large fan, in some cases a small fan may be advantageous to facilitate the airflow. The fan may not be required to operate at all times, and can be turned on only as needed. Whether system 10 operates with no fan, or with a small fan used only as needed, noise can be significantly reduced and parasitic energy loss resulting from the operation of fans is also reduced.

Although the present invention has been described with reference to preferred embodiments, workers skilled in the art will recognize that changes may be made in form and detail without departing from the spirit and scope of the invention.

The invention claimed is:

1. A temperature control system for an elevator system, the temperature control system comprising:
    an air funnel positioned to collect a natural convective airflow;
    a separator for dividing the airflow into a first flow path and a second flow path;
    a thermoelectric device having a cooling surface positioned in the first flow path and a heating surface positioned in the second flow path;
    an elevator system component positioned in one of the first and second flow paths; and
    an exhaust duct connected to upper ends of the first and second flow paths.

2. The temperature control system of claim 1 wherein the first and second flow paths extend upward in a generally vertical direction from the air funnel to the exhaust duct.

3. The temperature control system of claim 2 wherein the first and second flow paths connect to the exhaust duct so that a warm air stream from the second flow path draws a cool air stream from the first flow path into the exhaust duct.

4. The temperature control system of claim 1 wherein the component is positioned at least in part in the first flow path.

5. The temperature control system of claim 1 wherein the component is positioned in contact with one of the cooling surface and the heating surface.

6. The temperature control system of claim 1 wherein the component is positioned so that air in one of the first and second air paths flows past the thermoelectric device and then past the component.

7. The temperature control system of claim 1 wherein the air funnel is positioned in an upper end of a hoistway of the elevator system.

8. The temperature control system of claim 1 and further comprising:
    a cool air duct extending between the air funnel and the exhaust duct and defining the first flow path; and
    a warm air duct extending between the air funnel and the exhaust duct and defining the second flow path.

9. The temperature control system of claim 8 wherein the cool air duct extends generally vertically upward from the air funnel to the exhaust duct.

10. The temperature control system of claim 8 wherein the warm air duct extends generally vertically upward from the air funnel to the exhaust duct.

11. A temperature control system for an elevator system, the temperature control comprising:
    a warm air duct having an inlet at a lower end and an outlet at an upper end;
    a cool air duct having an inlet at a lower end and an outlet at an upper end;
    a thermoelectric device positioned to heat air in the warm air duct and to cool air in the cool air duct; and
    an elevator component positioned to be cooled by the thermoelectric device;
    wherein the outlet of the cool air duct is positioned with respect to the outlet of the warm air duct so that air flowing out of the warm air duct draws air upward through the cool air duct.

12. The temperature control system of claim 11 wherein the inlets of the warm air duct and the cool air duct receive air from a funnel.

13. The temperature control system of claim 11 wherein the inlets are positioned to receive upward flowing air in a hoistway of the elevator system.

14. The temperature control system of claim 13 wherein the inlets are positioned in an upper end of the hoistway.

15. The temperature control system of claim 11 wherein the elevator component is positioned above the thermoelectric device in the cool air duct.

16. The temperature control system of claim 9 and further comprising:
    an exhaust duct connected to the outlets of the warm air duct and the cool air duct.

17. A method of cooling an elevator component, the method comprising:
    collecting upward flowing air in a hoistway;
    directing portions of the upward flowing air into a cool air duct and a warm air duct;
    cooling air flowing through the cool air duct with a thermoelectric device; and
    cooling the elevator component with air flowing through the cool air duct.

18. The method of claim 17 and further comprising:
    drawing air in the cool air duct upward into an exhaust duct.

19. The method of claim 18 wherein drawing air comprises directing a warm air stream from the warm air duct past an outlet of the cool air duct to draw air from the cool air duct into the exhaust duct.

20. The method of claim 17 wherein air flows generally upward through the cool air duct and the warm air duct.

21. The method of claim 17 wherein collecting upward flowing air occurs at an upper end of the hoistway.

22. The method of claim 17 wherein the cool air duct and the warm air duct are thermally insulated from one another.

23. The method of claim 17 wherein the elevator component is in contact with the thermoelectric device.

* * * * *